US007180763B2

(12) United States Patent
Patwardhan et al.

(10) Patent No.: US 7,180,763 B2
(45) Date of Patent: Feb. 20, 2007

(54) POWER CONVERTER

(75) Inventors: Ajay V. Patwardhan, Canton, MI (US);
Douglas K. Maly, Jefferson, MA (US);
Fred Flett, Bloomfield, MI (US);
Sayeed Ahmed, Canton, MI (US);
Pablo Rodriguez, Dearborn, MI (US);
Kanghua Chen, Canton, MI (US);
Gerardo Jimenez, Southgate, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 183 days.

(21) Appl. No.: 10/945,850

(22) Filed: Sep. 21, 2004

(65) Prior Publication Data
US 2006/0062023 A1 Mar. 23, 2006

(51) Int. Cl.
*H02M 1/00* (2006.01)
(52) U.S. Cl. ...................................... 363/144
(58) Field of Classification Search ............... 363/16, 363/55, 56.01, 131, 144
See application file for complete search history.

(56) References Cited

U.S. PATENT DOCUMENTS

| 4,142,231 A | 2/1979 | Wilson et al. .............. 363/141 |
| 4,224,663 A | 9/1980 | Maiese et al. .............. 363/144 |
| 4,458,305 A | 7/1984 | Buckle et al. .............. 363/141 |
| 4,661,897 A | 4/1987 | Pitel ............................ 363/17 |
| 4,674,024 A | 6/1987 | Paice et al. ................... 363/71 |
| 5,172,310 A | 12/1992 | Deam et al. ................ 363/144 |
| 5,184,291 A | 2/1993 | Crowe et al. ................. 363/37 |
| 5,230,632 A | 7/1993 | Baumberger et al. ......... 439/66 |
| 5,243,757 A | 9/1993 | Grabbe et al. ................ 29/882 |
| 5,264,761 A | 11/1993 | Johnson ...................... 315/291 |
| 5,395,252 A | 3/1995 | White ......................... 439/66 |
| 5,422,440 A | 6/1995 | Palma .................... 174/133 B |
| 5,439,398 A | 8/1995 | Testa et al. ................. 439/801 |
| 5,445,526 A | 8/1995 | Hoshino et al. .............. 439/69 |
| 5,459,356 A | 10/1995 | Schulze et al. ............. 257/773 |
| 5,508,560 A | 4/1996 | Koehler et al. ............. 257/730 |
| 5,537,074 A | 7/1996 | Iversen et al. .............. 327/564 |
| 5,559,374 A | 9/1996 | Ohta et al. .................. 257/723 |

(Continued)

FOREIGN PATENT DOCUMENTS

DE 195 19 538 A1 11/1996

(Continued)

OTHER PUBLICATIONS

Mohan et al., *Power Electronics: Converters, Applications and Designs*, John Wiley & Sons Inc., 1989, Chapter 26-8, " Circuit Layout," p. 654.

(Continued)

*Primary Examiner*—Adolf Berhane
(74) *Attorney, Agent, or Firm*—Seed IP Law Group PLLC

(57) ABSTRACT

A power converter comprising a DC/AC bridge circuit electrically coupled between positive and negative DC bus terminals and a set of phase terminals, a DC/DC bridge circuit electrically coupled to the positive and negative DC bus terminals and a set of DC bridge terminals. The power converter may be configured to control the transfer of power to and/or from the DC bridge terminals and to control the transfer of power to and/or from the AC phase terminals.

26 Claims, 4 Drawing Sheets

U.S. PATENT DOCUMENTS

| | | | |
|---|---|---|---|
| 5,635,751 A | 6/1997 | Ikeda et al. | 257/584 |
| 5,653,598 A | 8/1997 | Grabbe | 439/66 |
| 5,756,935 A | 5/1998 | Balanovsky et al. | 174/52.1 |
| 5,847,951 A | 12/1998 | Brown et al. | 363/147 |
| 5,938,451 A | 8/1999 | Rathburn | 439/66 |
| 5,975,914 A | 11/1999 | Uchida | 439/66 |
| 6,021,052 A * | 2/2000 | Unger et al. | 363/26 |
| 6,054,765 A | 4/2000 | Eytcheson et al. | 257/724 |
| 6,072,707 A | 6/2000 | Hochgraf | 363/71 |
| 6,078,173 A | 6/2000 | Kumar et al. | 324/158.1 |
| 6,078,501 A | 6/2000 | Catrambone et al. | 361/704 |
| 6,166,937 A | 12/2000 | Yamamura et al. | 363/141 |
| 6,176,707 B1 | 1/2001 | Neidich et al. | 439/66 |
| 6,212,087 B1 | 4/2001 | Grant et al. | 363/144 |
| 6,292,371 B1 | 9/2001 | Toner, Jr. | 361/752 |
| 6,434,008 B1 | 8/2002 | Yamada et al. | 361/728 |
| 6,603,672 B1 | 8/2003 | Deng et al. | 363/37 |
| 6,624,533 B1 * | 9/2003 | Swanson et al. | 307/64 |
| 6,636,429 B2 | 10/2003 | Maly et al. | 361/818 |
| 6,793,502 B2 | 9/2004 | Parkhill et al. | 439/66 |
| 7,012,822 B2 * | 3/2006 | Zhu et al. | 363/70 |
| 2002/0034088 A1 | 3/2002 | Parkhill et al. | 363/144 |
| 2002/0111050 A1 | 8/2002 | Parkhill et al. | 439/65 |
| 2002/0118560 A1 | 8/2002 | Ahmed et al. | 363/144 |
| 2002/0126465 A1 | 9/2002 | Maly et al. | 361/818 |
| 2002/0167828 A1 | 11/2002 | Parkhill et al. | 363/144 |
| 2003/0214826 A1 | 11/2003 | Zhu et al. | 363/132 |
| 2004/0062059 A1 | 4/2004 | Cheng et al. | 363/17 |
| 2004/0228094 A1 | 11/2004 | Ahmed et al. | 361/702 |

FOREIGN PATENT DOCUMENTS

| | | |
|---|---|---|
| EP | 0 427 143 A2 | 5/1991 |
| EP | 0 578 108 A1 | 1/1994 |
| JP | 5-292759 | 11/1993 |
| JP | 9-117126 | 5/1997 |
| JP | 2003-199353 | 7/2003 |

OTHER PUBLICATIONS

Persson, E., "Power Electronic Design and Layout Techniques for Improved Performance and Reduced EMI," *Proceedings of Power Electronics in Transportation, IEEE*, Dearborn, Michigan, Oct. 20-21, 1994, pp. 79-82.

* cited by examiner

POWER CONVERTER

BACKGROUND OF THE INVENTION

1. Field of the Invention

This disclosure is generally related to electrical power systems, and more particularly to an architecture suitable for use in electrical power converters.

2. Description of the Related Art

Power modules are typically self-contained units that transform and/or condition power from one or more power sources for supplying power to one or more loads. Power modules commonly referred to as "inverters" transform direct current (DC) to alternating current (AC), for use in supplying power to an AC load. Power modules commonly referred to as "rectifiers" transform AC to DC. Power modules commonly referred to as "DC/DC converters" step up or step down a DC voltage. The term "converter" is commonly applied generically to all power modules whether inverters, rectifiers and/or DC/DC converters that transform or otherwise condition power.

There are a large variety of applications requiring power transformation and/or conditioning. For example, a DC power source such as a fuel cell system, battery and/or ultracapacitor may supply DC power, which must be inverted to provide power to an AC load such as a three-phase AC motor in an electric or hybrid vehicle. A photo-voltaic array may produce DC power which must be inverted to provide or export AC power to a power grid of a utility. An AC power source such as a power grid or micro-turbine may need to be rectified to provide power to a DC load such as a tool, machine or appliance. A high voltage DC source may need to be stepped down to supply a low voltage load, or a low voltage DC source may need to be stepped up to supply a high voltage load. Other applications will become apparent to those of skill in the art based on the teachings herein.

SUMMARY OF THE INVENTION

In one aspect, a power system comprises: a power converter, comprising: a housing comprising an interior and an exterior; a set of input/output terminals comprising: a plurality of phase terminals secured to the housing and accessible from the exterior of the housing; a plurality of DC/DC bridge terminals secured to the housing and accessible from the exterior of the housing; a positive DC bus terminal secured to the housing and accessible from the exterior of the housing; and a negative DC bus terminal secured to the housing and accessible from the exterior of the housing; a DC/AC bridge circuit received within the interior of the housing and electrically connected to the positive DC bus terminal, the negative DC bus terminal, and the plurality of phase terminals; a DC/DC bridge circuit received within the interior of the housing and electrically connected to the positive DC bus terminal, the negative DC bus terminal, and the plurality of DC/DC bridge terminals; and means for selectively transferring power from the plurality of DC/DC bridge terminals to the plurality of phase terminals and for selectively transferring power from the plurality of phase terminals to the plurality of DC/DC bridge terminals. The means for selectively transferring power from the plurality of DC/DC bridge terminals to the plurality of phase terminals and for selectively transferring power from the plurality of phase terminals to the plurality of DC/DC bridge terminals may comprise a control subsystem.

In another aspect, a system comprises: a power converter, comprising: a housing comprising an exterior; a set of input/output terminals comprising: a plurality of phase terminals carried by the housing and accessible from the exterior of the housing; a plurality of DC/DC bridge terminals carried by the housing and accessible from the exterior of the housing; a positive DC bus terminal carried by the housing and accessible from the exterior of the housing; and a negative DC bus terminal carried by the housing and accessible from the exterior of the housing; a DC/AC bridge circuit received within the housing and electrically connected to the positive DC bus terminal, the negative DC bus terminal, and the phase terminals; and a DC/DC bridge circuit received within the housing and electrically connected to the positive DC bus terminal, the negative DC bus terminal, and the DC/DC bridge terminals; and a control subsystem operable in a plurality of modes of operation, the plurality of modes of operation comprising: a first mode of operation wherein the control subsystem generates control signals to control a transfer of power from the DC bridge terminals to the positive and negative DC bus terminals; and a second mode of operation wherein the control subsystem generates control signals to control a transfer of power from the positive and negative DC bus terminals to the phase terminals.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various embodiments of the present systems. However, one skilled in the art will understand that the systems may be practiced without these details. In other instances, well-known structures such as control systems including microprocessors and drive circuitry have not been shown or described in detail to avoid unnecessarily obscuring descriptions of the embodiments of the present systems.

Unless the context requires otherwise, throughout the specification and claims which follow, the word "comprise" and variations thereof, such as, "comprises" and "comprising" are to be construed in an open, inclusive sense, that is as "including, but not limited to."

The headings provided herein are for convenience only and do not interpret the scope or meaning of the claimed invention.

Figure 1:
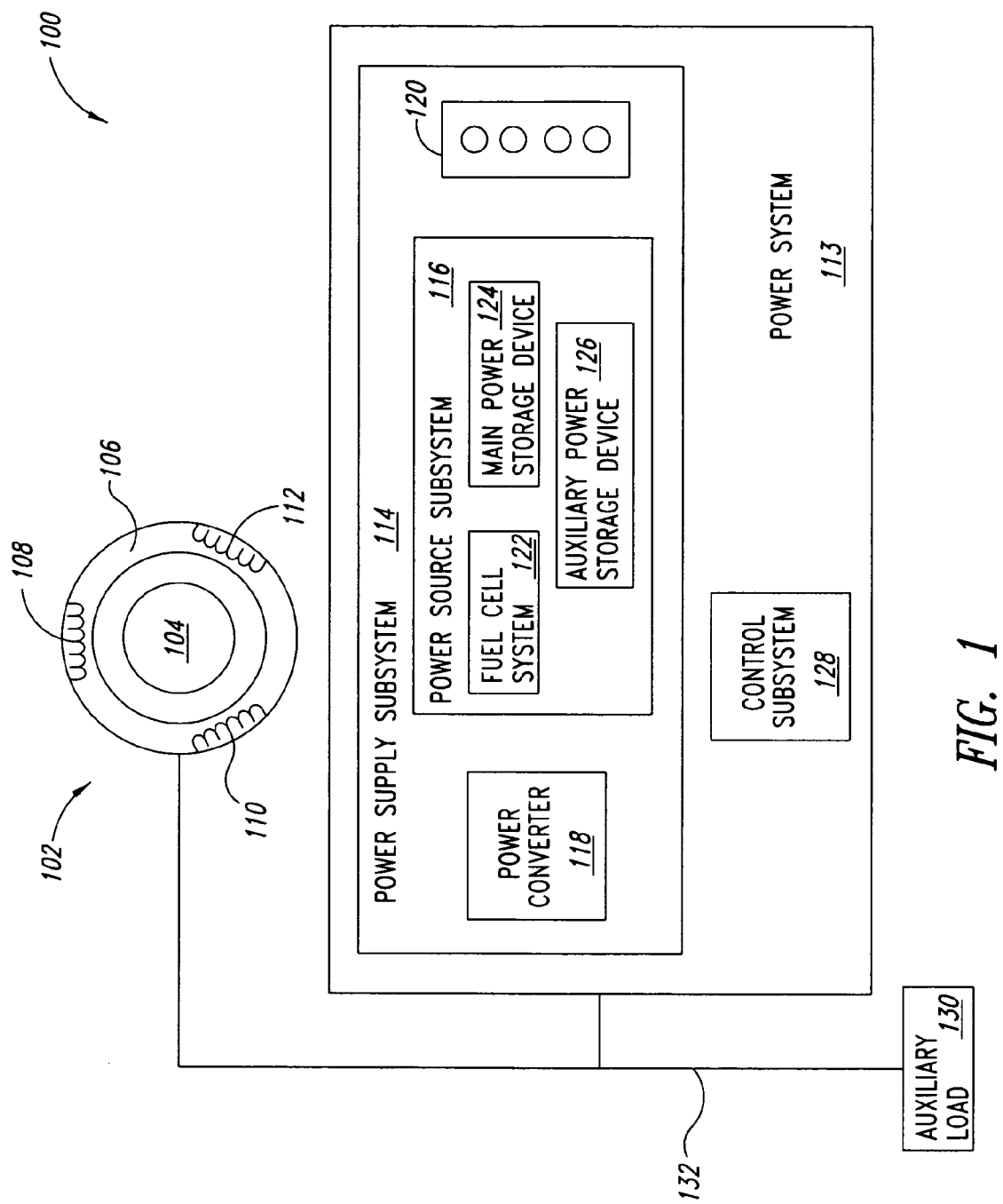
FIG. 1 is a functional block diagram of a system employing an embodiment of a power converter.

FIG. 1 is a functional block diagram of a system 100 employing an embodiment of a power converter. The system 100 comprises an alternating current machine 102 comprising a rotor 104, and a stator 106 comprising first, second and third windings 108, 110, 112. The alternating current machine 102 may, for example, take the form of a motor or a generator, or may operate as a motor at one time and may operate as a generator at another time. For example, the alternating current machine 102 may operate as a traction motor in an electric or hybrid vehicle to drive the wheels at one time, and may operate as a generator at another time during regenerative braking of the vehicle.

The system 100 also comprises a power system 113. The power system 113 comprises a power supply subsystem 114 and a control subsystem 128. The power supply subsystem 114 comprises a power source subsystem 116, a power converter 118. In some embodiments, power supply subsystem may also comprise a power connector 120, as depicted in FIG. 1. Power connector 120 is accessible from outside the power system 113 to facilitate connections between the power system 113 and external power sources or loads. For example, the power system 113 may be coupled to an external AC or a DC power source or load (not shown) through the power connector 120. The power source or load may or may not comprise a transformer.

As illustrated, the power source subsystem 116 comprises a fuel cell system 122, a main power storage device 124, such as one or more battery cells and/or ultra or super capacitors, and an auxiliary power storage device 126, such as one or more battery cells and/or ultra or super capacitors. Any suitable power source or sources, such as power production devices and/or power storage devices, however, may be employed in the power source subsystem 116. For example, the power source subsystem 116 may contain only a battery or only a fuel cell system. The fuel cell system 122 typically comprises a fuel cell stack and associated hardware for operating the fuel cell stack, sometimes referred to as the balance of plant, or BOP. Under certain conditions, the fuel cell system 122 can present a load to the power system 113. For example, when the system 100 is started up, the fuel cell system 122 may draw power to operate the BOP.

A control subsystem 128 generates control signals for controlling the operation of the power system 113, including the power supply subsystem 114 and the power converter 118. The control subsystem 128 may be implemented in a variety of ways, including as separate subsystems. The control subsystem 128 may be implemented as a digital signal processor (DSP), an application-specific integrated circuit (ASIC), or the like, or as a series of instructions placed in a memory (not shown). Thus, software modifications to existing hardware may allow the implementation of the control subsystem 128. Various subsystems, such as the control subsystem 128 and the power supply subsystem 114, are identified as separate blocks in the functional block diagram of FIG. 1 because they perform specific functions that will be described in more detail below. These subsystems may not be discrete units but may be functions of a software routine or combinations of discrete units and functions of a software routine. Although illustrated as separate components, the various components of the system 100 may be combined in some embodiments. For example, the control subsystem 128 may be incorporated into the power supply subsystem 114 or into the power converter 118 in some embodiments.

The system 100 also comprises an auxiliary load 130. The auxiliary load 130 may be a DC load or an alternating current load. For example, the auxiliary load may comprise circuitry to supply power to the control subsystem 128 and/or a BOP of the fuel cell system 122.

The alternating current machine 102, the power system 113, and the auxiliary load 130 are coupled together by a bus system 132, which may include a power bus, control bus, and status signal bus in addition to a data bus. For the sake of clarity, however, the various buses are illustrated in FIG. 1 as the bus system 130. Bus system connections and components within the alternating current machine 102, the power system 113, and the auxiliary load 130 have been omitted for clarity.

Figure 2:
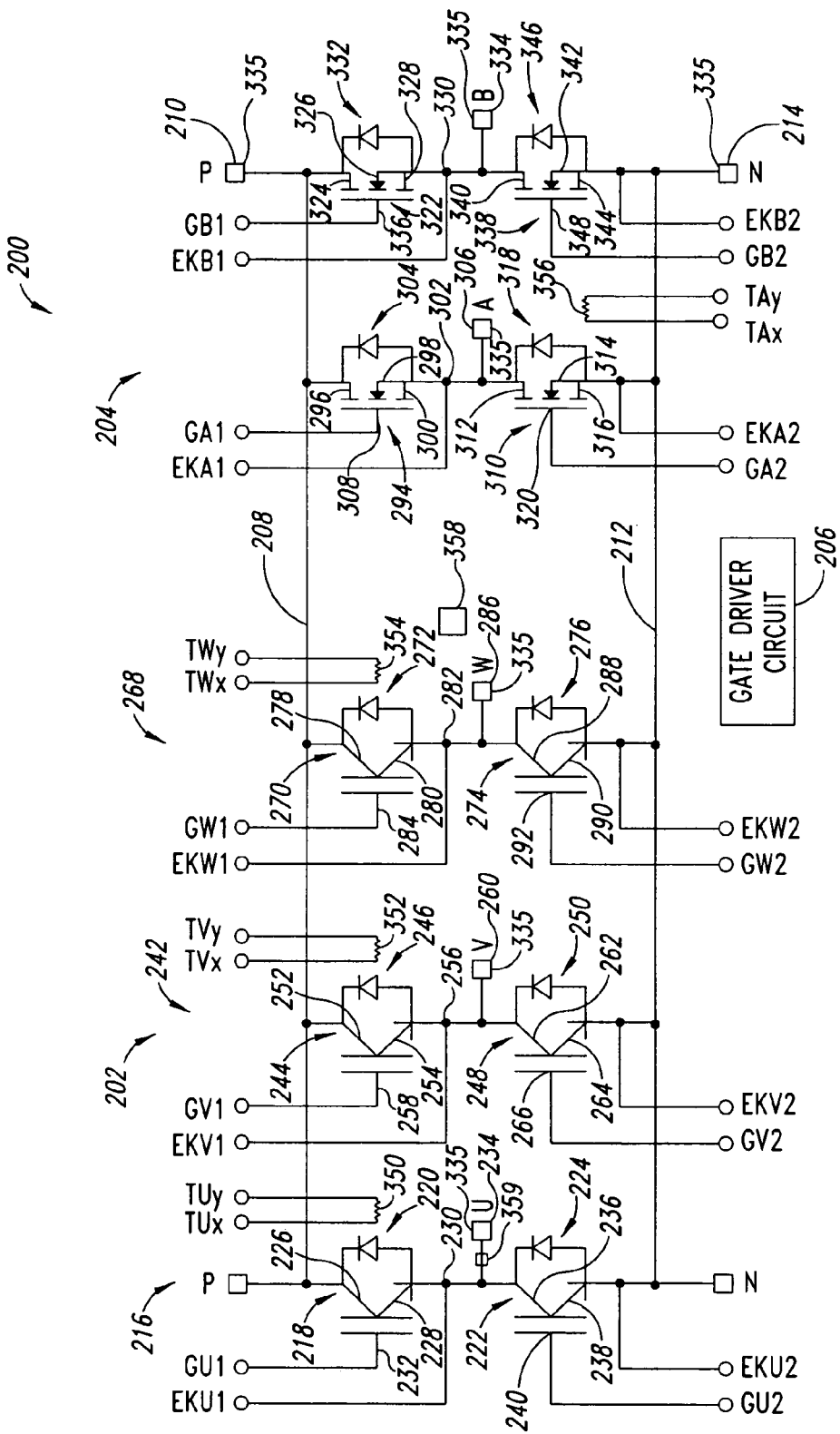
FIG. 2 is an electric schematic diagram of an embodiment of a power converter.

FIG. 2 is an electrical schematic diagram of a power converter 200 according to one illustrated embodiment. The power converter 200 comprises a three-phase, four quadrant DC/AC bridge circuit 202, a bi-directional DC/DC bridge circuit 204, a gate driver circuit 206, a positive DC bus line 208 coupled to a positive DC bus line terminal 210, and a negative DC bus line 212 coupled to a negative DC bus line terminal 214. In one embodiment, the positive DC bus terminal 210 is integrated into the positive DC bus bar 208 and the negative DC bus terminal 214 is integrated into the negative DC bus bar 212.

The control subsystem 128 is communicatively coupled to the gate driver circuit 206 and selectively generates control signals to control the operation of the DC/AC bridge circuit 202 and the DC/DC bridge circuit 204. The gate driver circuit 206 generates gate drive signals in response to the control signals generated by the control subsystem 128. The control subsystem 128 and the gate driver circuit 206 may be integrated into the power converter 200 or may be separate components. As illustrated, the control subsystem 128 is a separate component and the gate driver circuit 206 is integrated into the power converter 200.

The DC/AC bridge circuit 202 comprises a first leg 216 comprised of a first power transistor 218, a first anti-parallel diode 220, a second power transistor 222 and a second anti-parallel diode 224. A collector 226 of the first power transistor 218 is electrically coupled to the positive DC bus line 208. An emitter 228 of the first power transistor 218 is electrically coupled to a first node 230. The first anti-parallel diode 220 is electrically coupled across the collector 226 and the emitter 228 of the first power transistor 218. The first power transistor 218 comprises a control terminal 232, which is communicatively coupled to the gate driver circuit 206 through a gate drive signal line GU1. The first leg 216 has a first phase terminal 234 electrically coupled to the first node 230. The first node 230 is communicatively coupled to the gate driver circuit 206 through a gate drive signal line EKU1.

A collector 236 of the second power transistor 222 is electrically coupled to the first node 230. An emitter 238 of the second power transistor 222 is electrically coupled to the negative DC bus line 212. The second anti-parallel diode 224 is electrically coupled across the collector 236 and the emitter 238 of the second power transistor 222. The second power transistor 222 comprises a control terminal 240, which is communicatively coupled to the gate driver circuit 206 through a gate drive signal line GU2. The emitter 238 of the second power transistor 222 is communicatively coupled to the gate driver circuit 206 through a gate drive signal line EKU2.

The DC/AC bridge circuit 202 comprises a second leg 242 comprised of a third power transistor 244, a third anti-parallel diode 246, a fourth power transistor 248 and a fourth anti-parallel diode 250. A collector 252 of the third power transistor 244 is electrically coupled to the positive DC bus line 208. An emitter 254 of the third power transistor 244 is electrically coupled to a second node 256. The third anti-parallel diode 246 is electrically coupled across the collector 244 and the emitter 254 of the third power transistor 244. The third power transistor 244 comprises a control terminal 258, which is communicatively coupled to the gate driver circuit 206 through a gate drive signal line GV1. The second leg 242 has a second phase terminal 256 electrically coupled to the second node 256. The second node 256 is communicatively coupled to the gate driver circuit 206 through a gate drive signal line EKV1.

A collector 262 of the fourth power transistor 248 is electrically coupled to the second node 256. An emitter 264 of the fourth power transistor 248 is electrically coupled to the negative DC bus line 212. The fourth anti-parallel diode 250 is electrically coupled across the collector 262 and the emitter 264 of the fourth power transistor 248. The fourth power transistor 248 comprises a control terminal 266, which is communicatively coupled to the gate driver circuit 206 through a gate drive signal line GV2. The emitter 264 of the fourth power transistor 248 is communicatively coupled to the gate driver circuit 206 through a gate drive signal line EKV2.

The DC/AC bridge circuit 202 comprises a third leg 268 comprised of a fifth power transistor 270, a fifth anti-parallel diode 272, a sixth power transistor 274 and a sixth anti-parallel diode 276. A collector 278 of the fifth power transistor 270 is electrically coupled to the positive DC bus line 208. An emitter 280 of the fifth power transistor 270 is electrically coupled to a third node 282. The fifth anti-parallel diode 272 is electrically coupled across the collector 278 and the emitter 280 of the fifth power transistor 270. The fifth power transistor 270 comprises a control terminal 284, which is communicatively coupled to the gate driver circuit 206 through a gate drive signal line GW1. The third leg 268 has a third phase terminal 286 electrically coupled to the third node 282. The third node 282 is communicatively coupled to the gate driver circuit 206 through a gate drive signal line EKW1.

A collector 288 of the sixth power transistor 274 is electrically coupled to the third node 282. An emitter 290 of the sixth power transistor 274 is electrically coupled to the negative DC bus line 212. The sixth anti-parallel diode 276 is electrically coupled across the collector 288 and the emitter 290 of the sixth power transistor 274. The sixth power transistor 274 comprises a control terminal 292, which is communicatively coupled to the gate driver circuit 206 through a gate drive signal line GW2. The emitter 290 of the sixth power transistor 274 is communicatively coupled to the gate driver circuit 206 through a gate drive signal line EKW2.

The power transistors in the DC/AC bridge circuit 202 as illustrated take the form of one or more integrated gate bipolar transistors (IGBTs), however other power transistors may be employed, such as metal-oxide semiconductor field effect transistors (MOSFETs), with respective diodes electrically coupled in parallel across the switches. In some embodiments, the diodes may be the body diodes of the transistors. The DC/AC bridge circuit 202 may be operated, for example, as a switch-mode three-phase inverter, as a switch-mode single-phase inverter, and/or as a switch-mode rectifier. As discussed in more detail below, in one configuration the DC/AC bridge circuit 202 might, for example, transfer power from the positive and negative DC bus lines 208, 212 to the first, second and third phase terminals 234, 260, 286. In another configuration the DC/AC bridge circuit 202 might transfer power from one or more of the first, second and third phase terminals 234, 260, 286 to the positive and negative DC bus lines 208, 212.

The power converter 200 also comprises a bi-directional DC/DC bridge circuit 204. The DC/DC bridge circuit 204 as illustrated is an H-bridge.

The DC/DC bridge circuit 204 comprises a seventh power transistor 294. The drain 296 of the seventh power transistor 294 is electrically coupled to the positive DC bus line 208. The channel or substrate 298 is electrically coupled to the source 300, which is electrically coupled to a fourth node 302. A seventh anti-parallel diode 304 is electrically coupled across the drain 296 and the source 300 of the seventh power-transistor 294. A first DC/DC bridge terminal 306 is electrically coupled to the fourth node 302. The seventh power transistor 294 comprises a gate 308, which is communicatively coupled to the gate driver circuit 206 through a gate driver signal line GA1. The source 300 of the seventh power transistor 294 is communicatively coupled to the gate driver circuit 206 through a gate driver signal line EKA1.

The DC/DC bridge circuit 204 comprises an eighth power transistor 310. The drain 312 of the eighth power transistor 310 is electrically coupled to the fourth node 302. The channel or substrate 314 is electrically coupled to the source 316, which is electrically coupled to the negative DC bus line 212. An eighth anti-parallel diode 318 is electrically coupled across the drain 312 and the source 316 of the eighth power transistor 310. The eighth power transistor 310 comprises a gate 320, which is communicatively coupled to the gate driver circuit 206 through a gate driver signal line GA2. The source 316 of the eighth power transistor 310 is communicatively coupled to the gate driver circuit 206 through a gate driver signal line EKA2.

The DC/DC bridge circuit 204 comprises a ninth power transistor 322. The drain 324 of the ninth power transistor 322 is electrically coupled to the positive DC bus line 208. The channel or substrate 326 is electrically coupled to the source 328, which is electrically coupled to a fifth node 330. A ninth anti-parallel diode 332 is electrically coupled across the drain 324 and the source 328 of the ninth power transistor 322. A second DC/DC bridge terminal 334 is electrically coupled to the fifth node 330. The ninth power transistor 322 comprises a gate 336, which is communicatively coupled to the gate driver circuit 206 through a gate driver signal line GB1. The source 328 of the ninth power transistor 322 is communicatively coupled to the gate driver circuit 206 through a gate driver signal line EKB1.

The DC/DC bridge circuit 204 comprises a tenth power transistor 338. The drain 340 of the tenth power transistor 338 is electrically coupled to the fifth node 330. The channel or substrate 342 is electrically coupled to the source 344, which is electrically coupled to the negative DC bus line 212. A tenth anti-parallel diode 346 is electrically coupled across the drain 340 and the source 344 of the tenth power transistor 338. The tenth power transistor 338 comprises a gate 348, which is communicatively coupled to the gate driver circuit 206 through a gate driver signal line GB2. The source 344 of the tenth power transistor 338 is communicatively coupled to the gate driver circuit 206 through a gate driver signal line EKB2.

The power transistors in the DC/DC bridge circuit 204 as illustrated take the form of one or more n-channel metal-oxide semiconductor field effect transistors (MOSFETs), however, other power transistors may be employed, such as p-channel MOSFETs and/or IGBTs, with respective diodes electrically coupled in parallel across the switches. In some embodiments, the diodes may be the body diodes of the transistors.

The power converter 200 comprises first, second and third thermal sensors 350, 352, 354 to sense thermal conditions and/or temperatures of or in the vicinity of the first, second and third legs 216, 242, 268, respectively, of the DC/AC bridge circuit 202. The power converter 200 also comprises a fourth thermal sensor 356 to sense thermal conditions and/or temperatures of or in the vicinity of the DC/DC bridge circuit 204. The power converter 200 also comprises a current sensor 358, to sense a current flowing through the fifth transistor 270 in the third leg 268 of the DC/AC bridge circuit 202. Additional current sensors may be employed to sense other currents, such as currents flowing through other power transistors in the DC/AC bridge circuit 202 or the DC/DC bridge circuit 204. The power converter 200 also comprises a circuit protection device 359, such as a circuit breaker, to protect the first leg 216 of the DC/AC bridge circuit 202. Additional circuit protection devices may be employed to protect other circuits and components of the power converter 200.

The positive DC bus terminal 210, the negative DC bus terminal 214, the phase terminals 234, 260, 286, and the DC/DC bridge terminals 306, 334, together comprise a set of input/output terminals 335, which are externally accessible from an exterior of a housing (see housing 360 in FIGS. 3 and 4) of the power converter or module 200.

The power converter 200 is very flexible and can be used in a number of industrial applications without requiring the connection of unique, application specific individual converters with associated high voltage, high current power distribution hardware. The power converter 200 can be standardized for use in a wide variety of applications, greatly reducing design, tooling, testing, certification and inventory costs and requirements. Various example embodiments, discussed with reference to FIGS. 1 and 2, demonstrate the increased flexibility of the power converter 200.

In one example embodiment, the power system 113 is configured to transfer power from the power supply subsystem 114 to the windings 108, 110, 112 of the alternating current machine 102, generating movement of the rotor 104 with respect to the stator 106. The positive and negative DC bus lines 208, 212 are electrically coupled to the power source subsystem 116, and the windings 108, 110, 112 of the alternating current machine 102 are electrically coupled to the first, second and third phase terminals 234, 260, 286. The control subsystem 128 generates control signals to cause the DC/AC bridge circuit 202 to transfer power from a DC source (such as the output of the fuel cell system 122) electrically coupled across the positive DC bus terminal 210 and the negative DC bus terminal 214 to an AC load (such as the windings 108, 110, 112) electrically coupled to the three phase terminals 234, 260, 286, thus transferring power from the power supply subsystem 114 to the alternating current machine 102. For example, if the alternating current machine 102 is a motor vehicle, supplying power to the motor windings 108, 110, 112 can generate movement and torque of the rotor 104 with respect to the stator 106 that can be used to drive the wheels (not shown) of the motor vehicle. The power supply subsystem 114 may be configured to supply the power from, for example, the fuel cell system 122, the main power storage device 124, such as one or more batteries or ultra or super capacitors, and/or an external DC power source (not shown) through the power connector 120.

Alternatively, the first and second DC/DC bridge terminals 306, 334 may be electrically coupled to the power source subsystem 116 and the windings 108, 110, 112 of the alternating current machine 102 may be electrically coupled to the first, second and third phase terminals 234, 260, 286. The control subsystem 128 is configured to generate control signals to cause the DC/AC bridge circuit 202 and the DC/DC bridge circuit 204 to transfer power from a DC source (such as the power source subsystem 116) electrically coupled across the two DC/DC bridge terminals 306, 334 to an AC load (such as the windings 108, 110, 112) electrically coupled to the three phase terminals 234, 260, 286.

In another example embodiment, the power system 113 is configured to transfer power from the windings 108, 110, 112 of the alternating current machine 102 to the power source subsystem 116. In a motor vehicle, this may be referred to a regenerative braking. The power supply subsystem 114 may, for example, store the power in the main power storage device 124 and/or the auxiliary power storage device 126. The positive and negative DC bus terminals 210, 214 are electrically coupled to the power source subsystem 116, and the windings 108, 110, 112 of the alternating current machine 102 are electrically coupled to the first, second and third phase terminals 234, 260, 286. The control subsystem 128 generates control signals to cause the DC/AC bridge circuit 202 to transfer power from an AC source (such as the alternating current machine 102) electrically coupled to the AC phase terminals 234, 260, 286 to a load (such as the auxiliary power storage device 126 in the power source subsystem 116) electrically coupled across the positive and negative DC bus terminals 210, 214.

Alternatively, the control subsystem 128 could generate control signals to cause the DC/AC bridge circuit 202 and the DC/DC bridge circuit 204 to transfer power from an AC source electrically coupled to the AC phase terminals 234, 260, 286 to a DC load electrically coupled across the DC/DC bridge terminals 306, 334. For example, if the alternating current machine 102 is a motor vehicle operating in a regenerative braking mode, a current may be generated in the windings 108, 110, 112 by movement of the rotor 104 with respect to the stator 106 and that current can supply power that can be stored in the power source subsystem 116.

In another example embodiment, the power system 113 is configured to transfer power from an external DC source (not shown), connected to the power connector 120, to the power source subsystem 116 for storage in the main power storage device 124 and/or the auxiliary power storage device 126. The power connector 120 is electrically coupled to the positive and negative DC bus lines 208, 212. The first and second DC/DC bridge terminals 306, 334 are electrically coupled to the power source subsystem 116. The control subsystem 128 generates control signals to cause the DC/DC bridge circuit 204 to transfer power from the positive and negative DC bus terminals 210, 214 to the first and second DC/DC bridge terminals 306, 334.

In another example embodiment, the power system 113 is configured to transfer power from an external three-phase AC source (not shown), connected to the power connector 120, to the power source subsystem 116 for storage in the main power storage device 124 and/or the auxiliary power storage device 126. The external AC source might be, for example, a generator (not shown) coupled to a hybrid vehicle power train. The power connector 120 is electrically coupled to the first, second and third phase terminals 234, 260, 286. The first and second DC/DC bridge terminals 306, 334 are electrically coupled to the power source subsystem 116. The control subsystem 128 generates control signals to cause the DC/AC bridge circuit 202 to transfer power from the AC phase terminals 234, 260, 286 to the positive and negative DC bus lines 208, 212, and to cause the DC/DC bridge circuit 204 to transfer power from the positive and negative DC bus lines 208, 212 to the first and second DC/DC bridge terminals 306, 334. Alternatively, the power system 113 might transfer power from a single phase AC source (not shown) in a similar configuration.

In another example embodiment, the power system 113 is configured to transfer power from an external DC source (not shown) connected to the power connector 120 to the windings 108, 110, 112 of the alternating current machine 102. The power connector 120 is electrically coupled to the positive and negative DC bus terminals 210, 214. The windings 108, 110, 112 of the alternating current machine 102 are electrically coupled to the first, second and third phase terminals 234, 260, 286. The control subsystem 128 generates control signals to cause the DC/AC bridge circuit 202 to transfer power from the external source connected to the power connector 120 to the alternating current machine 102. The external source may, or may not, comprise a power supply with a transformer (not shown).

In another example embodiment, the power system 113 is configured to transfer power from the windings 108, 110, 112 of the alternating current machine 102 to an external load (not shown) connected to the power connector 120. The power connector 120 is electrically coupled to the positive and negative DC bus terminals 210, 214. The windings 108, 110, 112 of the alternating current machine 102 are electrically coupled to the first, second and third phase terminals 234, 260, 286 of the DC/AC bridge circuit 202. The control subsystem 128 generates control signals to cause the DC/AC bridge circuit 202 to transfer power from the alternating current machine 102 to the load connected to the power connector 120.

In another example embodiment, suitable to supply power to a DC auxiliary load 130, the power system 113 is configured to supply power to the auxiliary load 130. The power source subsystem 116 is electrically coupled to the positive and negative DC bus terminals 210, 214. The auxiliary load 130 is electrically coupled to first and second DC/DC bridge terminals 306, 334. The control subsystem 128 is configured to generate control signals causing the DC/DC bridge circuit 204 to transfer power from the positive and negative DC bus terminals 210, 214 to the first and second DC bridge terminals 306, 334.

In another example embodiment, suitable to supply power to a three-phase AC auxiliary load 130, the power source subsystem 116 is electrically coupled to the positive and negative DC bus terminals 210, 214. The auxiliary load 130 is electrically coupled to the first, second and third phase terminals 234, 260, 286. The control subsystem 128 is configured to generate control signals causing the DC/AC bridge circuit 202 to transfer power from the positive and negative DC bus terminals 210, 214 to the first, second and third phase terminals 234, 260, 286.

Various topologies and modes of operating alternating current machines are discussed in more detail in co-pending U.S. patent application Ser. No. 10/622,845, filed Jul. 18, 2003 and entitled APPARATUS AND METHOD EMPLOYING BI-DIRECTIONAL CONVERTER FOR CHARGING AND/OR SUPPLYING POWER, which is incorporated herein by reference in its entirety. The system 100 need not be configured to transfer power in all various topologies and modes described above and various topologies and/or modes of operation may be combined to create additional topologies and/or modes of operation. For example, the power system 113 may be configured to supply power to the control subsystem 128 while simultaneously transferring power from the power source subsystem 116 to the windings 108, 110, 112 of the alternating current machine 102. The power system 113 may employ additional components, such as additional switches, capacitors, resisters, inductors and/or transformers, in some embodiments.

If the alternating current machine 102 is a motor vehicle employing a fuel cell system power source, a voltage across the positive and negative DC bus lines 208, 212 will typically be uncontrolled and current may be drawn from the positive and negative DC bus lines 208, 212 on demand. If the alternating current machine 102 is a motor vehicle employing a hybrid power source (e.g., an internal combustion engine and battery and/or supercapacitor), a voltage across the positive and negative DC bus lines 208, 212 will typically be controlled to fully utilize the voltage ratings of the power transistors. A motor vehicle employing a fuel cell system power source, however, may be configured to control a voltage across the positive and negative DC bus lines 208, 212 and a motor vehicle employing a hybrid power source may not be configured to control a voltage across the positive and negative DC bus lines 208, 212.

Figure 3:
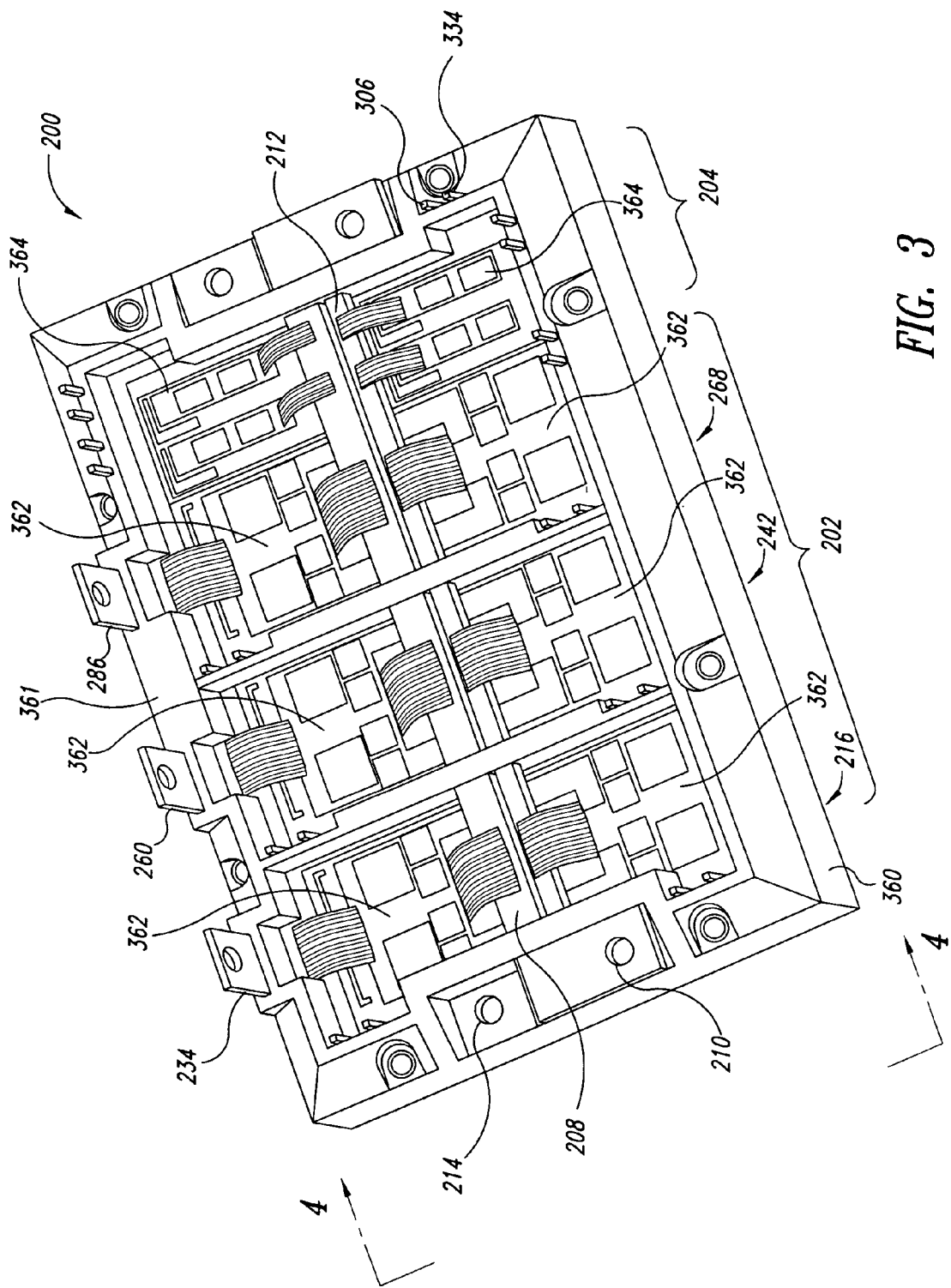
FIG. 3 is an isometric view of an embodiment of a power converter.
Figure 4:
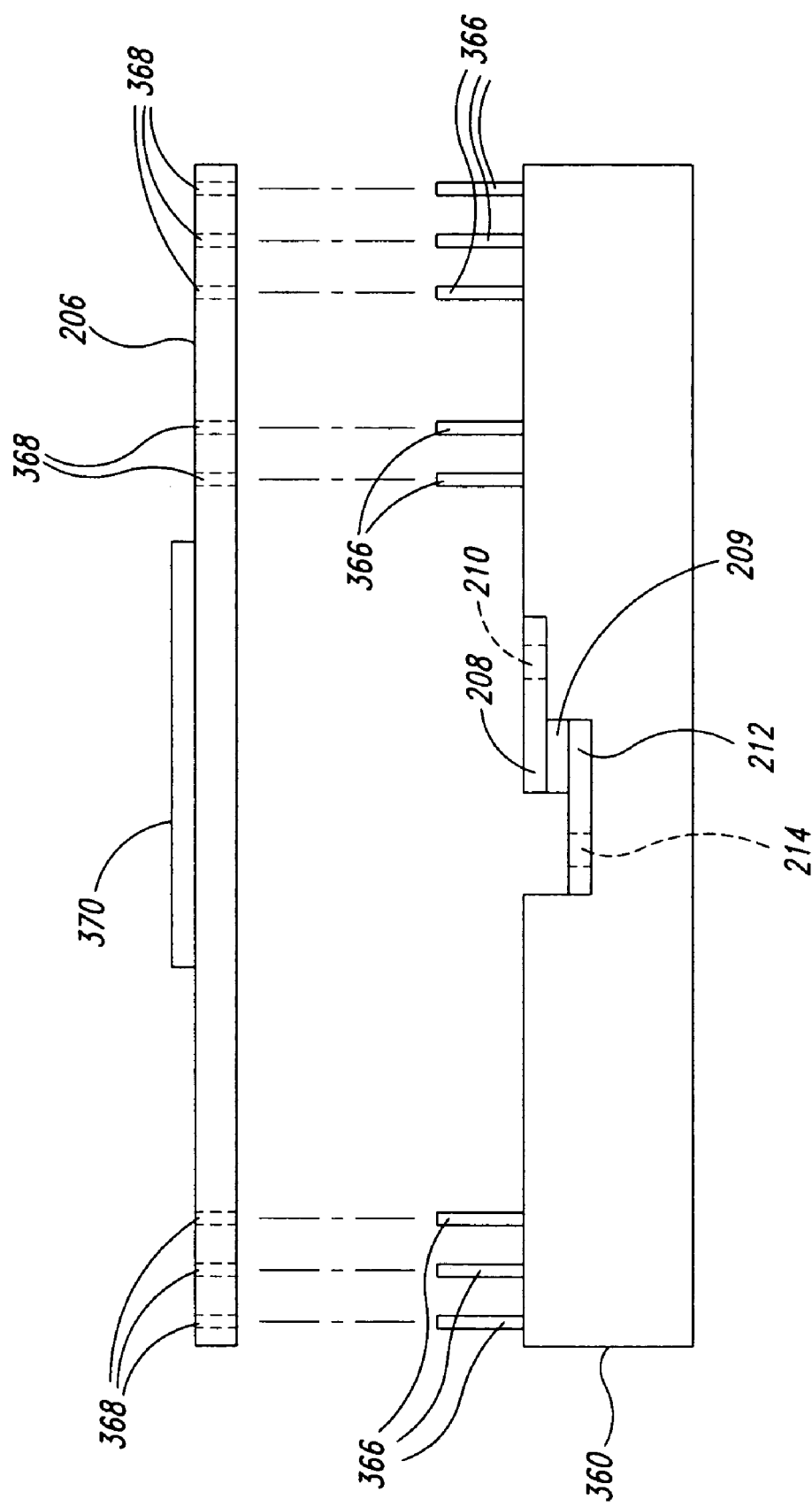
FIG. 4 is another isometric view of an embodiment of a power converter.

FIG. 3 is a partial isometric view of an embodiment of a power converter 200 suitable for use in the system 100 illustrated in FIG. 1. FIG. 4 is a partial exploded side plan view of the embodiment of a power converter 200 illustrated in FIG. 3. Similar reference numbers in FIGS. 3 and 4 correspond to similar components from FIG. 2. The power converter 200 comprises a DC/AC bridge circuit 202 and a DC/DC bridge circuit 204 received in a housing 360.

As illustrated in FIG. 3, the DC/AC bridge circuit 202 is comprised of three legs 216, 242, 268. Each leg is comprised of two conductive regions 362 received in the housing 360. The first leg 216 is electrically coupled to a first phase terminal 234. The second leg 242 is electrically coupled to a second phase terminal 260 and the third leg 268 is electrically coupled to a third phase terminal 286. The first, second and third phase terminals 234, 260, 286 are externally accessible from an exterior 361 of the housing 360 and connect the power converter 200 to AC power sources and loads, such as the alternating current machine 102 illustrated in FIG. 1.

The DC/AC bridge circuit 202 is electrically coupled to a positive DC bus bar 208, which comprises a positive DC bus terminal 210, and to a negative DC bus bar 212, which comprises a negative DC bus terminal 214. As illustrated, the positive DC bus terminal 210 is integrated into the positive DC bus bar 208 and the negative DC bus terminal 214 is integrated into the negative DC bus bar 212. The positive and negative DC bus bars 208, 212 are separated by an insulating layer 209 (shown in FIG. 4). In an alternative embodiment, the positive DC bus terminal 210 may be a separate component electrically coupled to the positive DC bus bar 208 and the negative DC bus terminal 214 may be a separate component electrically coupled to the negative DC bus bar 212.

The positive and negative DC bus bar terminals 210, 214 are accessible from an exterior 361 of the housing 360 and connect the power converter 200 to DC power sources and loads, such as the power source subsystem 116 and the auxiliary load 130 illustrated in FIG. 1.

The DC/DC bridge circuit 204 comprises two conductive regions 364 received in the housing 360. The DC/DC bridge circuit 204 is electrically coupled to the positive DC bus terminal 210 via the positive DC bus bar 208 and to the negative DC bus terminal 214 via the negative DC bus bar 210. The DC/DC bridge circuit 204 also is electrically coupled to first and second DC/DC bridge terminals 306, 334. The first and second DC/DC bridge terminals 306, 334 are externally accessible from an exterior 361 of the housing 360 and connect the power converter 200 to various DC power sources and loads, such as auxiliary power storage device 126 illustrated in FIG. 1.

The use of common positive and negative DC bus terminals 210, 214 for the DC/AC bridge circuit 202 and the DC/DC bridge circuit 204 eliminates the need for external bus bars and interconnects, which reduces costs and increases reliability. In one embodiment, the positive and negative bus bars 208, 212 may be integrated into the housing 360 and may be laminated.

The power converter 200 has control signal terminals 366 for receiving control signals from a gate driver circuit 206. As illustrated in FIG. 4, the control signal terminals 366 may facilitate incorporating the gate driver circuit 206 into the power converter 200. The gate driver circuit 206 has corresponding control signal ports 368 for connecting to respective control signal terminals 366. The gate driver circuit 206 also has a connector 370 for connecting to the control subsystem 128.

Although specific embodiments of and examples for the present systems and methods are described herein for illustrative purposes, various equivalent modifications can be made without departing from the spirit and scope of the invention, as will be recognized by those skilled in the relevant art. The teachings provided herein can be applied to power modules and power converters, rectifiers and/or inverters not necessarily the exemplary systems generally described above.

While elements may be described herein and in the claims as "positive" or "negative" such denomination is relative and not absolute. Thus, an element described as "positive" is shaped, positioned and/or electrically coupled to be at a higher relative potential than elements described as "negative" when the power converter 118, 200 is coupled to a power source. "Positive" elements are typically intended to be coupled to a positive terminal of a power source, while "negative" elements are intended to be coupled to a negative terminal or ground of the power source. Generally, "positive" elements are located or coupled to the high side of the power converter 118, 200 and "negative" elements are located or coupled to the low side of the power converter 118, 200. Similarly, an element may be described herein as a source and/or a power supply when the element is supplying power to the power converter 118, 200 and as a load when the element is drawing power from the power converter 118, 200.

The power converters described above may employ various methods and regimes for operating the power converters 118, 200 and for operating the transistors and switches (e.g., IGBTs). The particular method or regime may be based on the particular application and/or configuration. Basic methods and regimes will be apparent to one skilled in the art, and so will not be discussed in detail for the sake of brevity and clarity.

The various embodiments described above can be combined to provide further embodiments. All of the above U.S. patents, patent applications and publications referred to in this specification, including but not limited to: Ser. Nos. 60/233,992; 60/233,993; 60/233,994; 60/233,995 and 60/233,996 each filed Sep. 20, 2000; Ser. No. 09/710,145 filed Nov. 10, 2000; Ser. Nos. 09/882,708 and 09/957,047 both filed Jun. 15, 2001; Ser. Nos. 09/957,568 and 09/957,001 both filed Sep. 20, 2001; Ser. No. 10/109,555 filed Mar. 27, 2002, Ser. No. 10/360,832 filed Feb. 7, 2003 entitled INTEGRATED TRACTION INVERTER MODULE AND DC/DC CONVERTER; Ser. No. 60/471,387 filed May 16, 2003 entitled POWER MODULE ARCHITECTURE (Express Mail No. EV347013359US) are incorporated herein by reference, in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to comprise all power modules, rectifiers, inverters and/or converters that operate or embody the limitations of the claims. Accordingly, the invention is not limited by the disclosure, but instead its scope is to be determined entirely by the following claims.

The invention claimed is:

1. A power system, comprising:
   a power converter, comprising:
      a housing comprising an interior and an exterior;
      a set of input/output terminals comprising:
         a plurality of phase terminals secured to the housing and accessible from the exterior of the housing;
         a plurality of DC/DC bridge terminals secured to the housing and accessible from the exterior of the housing;
         a positive DC bus terminal secured to the housing and accessible from the exterior of the housing; and
         a negative DC bus terminal secured to the housing and accessible from the exterior of the housing;
      a DC/AC bridge circuit received within the interior of the housing and electrically connected to the positive DC bus terminal, the negative DC bus terminal, and the plurality of phase terminals;
      a DC/DC bridge circuit received within the interior of the housing and electrically connected to the positive DC bus terminal, the negative DC bus terminal, and the plurality of DC/DC- bridge terminals; and
   means for selectively transferring power from the plurality of DC/DC bridge terminals to the plurality of phase terminals and for selectively transferring power from the plurality of phase terminals to the plurality of DC/DC bridge terminals.

2. The power system of claim 1 wherein the means for selectively transferring power from the plurality of DC/DC bridge terminals to the plurality of phase terminals and for selectively transferring power from the plurality of phase terminals to the plurality of DC/DC bridge terminals comprises a gate driver circuit carried by the housing.

3. The power system of claim 1 wherein the means for selectively transferring power from the plurality of DC/DC bridge terminals to the plurality of phase terminals and for selectively transferring power from the plurality of phase terminals to the plurality of DC/DC bridge terminals comprises a control subsystem.

4. The power system of claim 3 wherein the control subsystem is configured to selectively generate control signals to cause the DC/AC bridge circuit to transfer power from a DC source electrically coupled across the positive DC bus terminal and the negative DC bus terminal to an AC load electrically coupled across two phase terminals.

5. The power system of claim 3 wherein the plurality of phase terminals comprises three phase terminals and the control subsystem is configured to selectively generate control signals to cause the DC/AC bridge circuit to transfer power from a DC source electrically coupled across the positive DC bus terminal and the negative DC bus terminal to an AC load electrically coupled to the three phase terminals.

6. The power system of claim 3 wherein the control subsystem is configured to selectively generate control signals to cause the DC/AC bridge circuit and the DC/DC bridge circuit to transfer power from a DC source electrically coupled to the plurality of DC/DC bridge terminals to an AC load electrically coupled across two phase terminals.

7. The power system of claim 3 wherein the control subsystem is configured to selectively generate control signals to cause the DC/AC bridge circuit to transfer power from an AC source electrically coupled to the plurality of phase terminals to a DC load electrically coupled across the positive DC bus terminal and the negative DC bus terminal.

8. The power system of claim 3 wherein the control subsystem is configured to selectively generate control signals to cause the DC/AC bridge circuit and the DC/DC bridge circuit to transfer power from an AC source electrically coupled across two phase terminals to a DC load electrically coupled across two DC/DC bridge terminals.

9. The power system of claim 3 wherein the control subsystem is configured to selectively generate control signals to cause the DC/DC bridge circuit to transfer power from a DC source coupled to the plurality of DC/DC bridge terminals to a DC load coupled across the positive DC bus terminal and the negative DC bus terminal.

10. The power system of claim 3 wherein the control subsystem is configured to selectively generate control signals to cause the DC/DC bridge circuit to transfer power from a DC source electrically coupled across the positive DC bus terminal and the negative DC bus terminal to a DC load electrically coupled to the plurality of DC/DC bridge terminals.

11. The power system of claim 1 wherein the means for selectively transferring power from the plurality of DC/DC bridge terminals to the plurality of phase terminals and for selectively transferring power from the plurality of phase terminals to the plurality of DC/DC bridge terminals is configured:

in a first mode of operation, to generate control signals causing the power converter to transfer power from a source electrically coupled across the positive and negative DC bus terminals to a load electrically coupled to the plurality of phase terminals; and in a second mode of operation, to transfer power from a source electrically coupled to the plurality of DC/DC bridge terminals to a load electrically coupled to the plurality of phase terminals.

12. The power system of claim 11 wherein the means for selectively transferring power from the plurality of DC/DC bridge terminals to the plurality of phase terminals and for selectively transferring power from the plurality of phase terminals to the plurality of DC/DC bridge terminals is further configured in a third mode of operation to transfer power from a source electrically coupled to the plurality of phase terminals to a load electrically coupled across the positive and negative DC bus terminals.

13. The power system of claim 11 wherein the means for selectively transferring power from the plurality of DC/DC bridge terminals to the plurality of phase terminals and for selectively transferring power from the plurality of phase terminals to the plurality of DC/DC bridge terminals is further configured in a third mode of operation to transfer power from a source electrically coupled to the plurality of phase terminals to a load electrically coupled to the plurality of DC/DC bridge terminals.

14. The power system of claim 1 wherein the means for selectively transferring power from the plurality of DC/DC bridge terminals to the plurality of phase terminals and for selectively transferring power from the plurality of phase terminals to the plurality of DC/DC bridge terminals is configured in one mode of operation to control a voltage across two DC/DC bridge terminals.

15. The power system of claim 1 wherein the means for selectively transferring power from the plurality of DC/DC bridge terminals to the plurality of phase terminals and for selectively transferring power from the plurality of phase terminals to the plurality of DC/DC bridge terminals is configured in one mode of operation to control a current provided at an AC phase terminal.

16. The power system of claim 1 wherein the means for selectively transferring power from the plurality of DC/DC bridge terminals to the plurality of phase terminals and for selectively transferring power from the plurality of phase terminals to the plurality of DC/DC bridge terminals is configured in one mode of operation to control a voltage across the positive and negative DC bus terminals.

17. A system, comprising:
a power converter, comprising:
a housing comprising an exterior;
a set of input/output terminals comprising:
a plurality of phase terminals carried by the housing and accessible from the exterior of the housing;
a plurality of DC/DC bridge terminals carried by the housing and accessible from the exterior of the housing;
a positive DC bus terminal carried by the housing and accessible from the exterior of the housing; and
a negative DC bus terminal carried by the housing and accessible from the exterior of the housing;
a DC/AC bridge circuit received within the housing and electrically connected to the positive DC bus terminal, the negative DC bus terminal, and the phase terminals; and
a DC/DC bridge circuit received within the housing and electrically connected to the positive DC bus terminal, the negative DC bus terminal, and the DC/DC bridge terminals; and
a control subsystem operable in a plurality of modes of operation, the plurality of modes of operation comprising:
a first mode of operation wherein the control subsystem generates control signals to control a transfer of power from the DC/DC bridge terminals to the positive and negative DC bus terminals; and
a second mode of operation wherein the control subsystem generates control signals to control a transfer of power from the positive and negative DC bus terminals to the phase terminals.

18. The system of claim 17 wherein the plurality of modes of operation further comprise a third mode of operation, wherein the control subsystem generates control signals to control a transfer of power from the DC/DC bridge terminals to the phase terminals.

19. The system of claim 17 wherein the plurality of operation modes further comprise a third mode of operation wherein the control subsystem generates control signals to control a transfer of power from the DC/DC bridge terminals to the phase terminals and a transfer of power from the DC/DC bridge terminals to the positive and negative DC bus terminals.

20. The system of claim 17 wherein the plurality of operational modes further comprise a third mode of operation wherein the control subsystem generates control signals to control a transfer of power from the positive and negative DC bus terminals to the DC/DC bridge terminals.

21. The system of claim 17 wherein the plurality of operational modes further comprise a third mode of operation wherein the control subsystem generates control signals to control a transfer of power from the positive and negative DC bus terminals to the DC/DC bridge terminals and a transfer of power from the positive and negative DC bus terminals to the phase terminals.

22. The system of claim 17 wherein the plurality of operational modes further comprise a third mode of operation wherein the control subsystem generates control signals to control a transfer of power from the phase terminals to the positive and negative DC bus terminals.

23. The system of claim 17 wherein the plurality of operational modes further comprise a third mode of operation wherein the control subsystem generates control signals to control a transfer of power from the phase terminals to the DC/DC bridge terminals.

24. The system of claim 17 wherein the plurality of operational modes further comprise a third mode of operation wherein the control subsystem generates control signals to control a transfer of power from the phase terminals to the positive and negative DC bus terminals and a transfer of power from the phase terminals to the DC/DC bridge terminals.

25. The system of claim 17, further comprising a power source subsystem electrically coupled to the power converter.

26. The system of claim 17, further comprising an alternating current machine electrically coupled to the phase terminals of the power converter.

* * * * *